Patented Jan. 29, 1952

2,583,771

UNITED STATES PATENT OFFICE 2,583,771

PREVENTION OF FOAMING IN STEAM GENERATION

Lewis O. Gunderson, Park Ridge, Ill., assignor to Dearborn Chemical Company, Chicago, Ill., a corporation of Illinois No Drawing. Application May 8, 1948,
Serial No. 25,983

6 Claims. (Cl. 252—321)

This invention relates to methods and compositions for conditioning water and, more particularly, for eliminating foaming conditions in water boiled under atmospheric or superatmospheric pressures.

The foaming of boiler water is not, as commonly thought, equivalent to an accumulation of foam on top of the surface of the boiling water such as may occur, for instance, when soap solutions are agitated. The foam or froth obtainable by blowing air through or stirring a soap solution accumulates on top of the water surface and presents a distinct water-froth interface. Such froth is the result of an equilibrium arrived at after a considerable period of time as a result of the interplay of various factors such as surface tension, forces tending to establish a more or less organized surface layer, preferential absorption and the like, and their interaction leads to the formation of relatively stable froth.

The foaming of boiler water, on the other hand, is due to the formation of a large number of relatively small steam bubbles having the property of resistance to coalescence while rising through the boiling water. The formation of such a large number of relatively small non-coalescing bubbles tends to excessively expand the boiling water until it enters the steam outlet without necessarily effecting the formation of a layer of stable froth on top of the boiling water. Further, a water that forms a stable froth on agitation or blowing of air therethrough does not necessarily or always foam or expand excessively on boiling.

I have now found that foaming or expansion on boiling water may be prevented by incorporation with the water of a relatively small amount of any of a homologous series of water dispersible compounds, which may be broadly designated as polyamide amine salts or polyamide quaternary ammonium salts, comprising the reaction products formed between an amine-alkylating agent such as dimethyl sulfate, dimethyl sulfite, methyl chloride, methyl iodide, β,β' dichloro diethyl ether, benzyl chloride, ethyl p-toluene sulfonate, and the like, and a polyalkylene polyamine that has been subjected to acylation with a higher carboxylic acid to the extent where at least two acyl groups have been attached to the polyalkylene polyamine.

The general structural formula for the compounds of this invention may be written

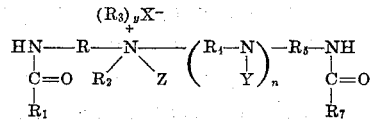

wherein $R_1$ and $R_7$ are hydrocarbon groups either saturated or unsaturated, straight or branched chain, or cyclic, and substituted or unsubstituted, and contain at least 11 carbon atoms; $R$, $R_4$, and $R_5$ are alkylene groups, $R_2$ is selected from the group consisting of alkyl, alkoxy, and substituted alkyl and alkoxy groups, $R_3$ is an alkyl group, $X$ is an anion of a mineral acid, $Z$ is a member of the group consisting of hydrogen and alkyl groups, $Y$ is a member of the group consisting of hydrogen and acyl radicals, and $y$ and $n$ are 0, 1, or 2.

The above formula and other formulae given in this specification and in the claims are believed to represent accurately the compounds that are disclosed herein as possessing foam inhibiting properties and as resulting from the methods of preparation herein set forth.

It is therefore an important object of the present invention to provide novel chemical compounds adapted for use in the prevention of foaming or excessive expansion of boiling water and comprising reaction products between amine alkylating agents and polyalkylene polyamines that have been at least diacylated with a higher molecular weight non-aromatic carboxylic acid, or equivalent acylating agent.

Another important object of the present invention is to provide a method for treating water to prevent foaming or excessive expansion on boiling and including the step of incorporating with said water a compound of the type indicated hereinabove.

Other and further objects and features of the present invention will become apparent from the following description and appended claims.

The organic compounds to which the present invention particularly relates comprise high molecular weight acylation products of polyalkylene polyamines, such as diethylene triamine, triethylene tetramine, tetraethylene pentamine, and other polyethylene polyamines, dipropylene triamine, tripropylene tetramine, diisopropylenetriamine, triisopropylene tetramine, dibutylene triamine, and the like. Other polyalkylene polyamine compounds may also be used, for instance, polyalkylene polyamine compounds characterized by heterogeneous linkages within the molecule, such as an ether, thio, thionyl, or aromatic radical as well as the polyamides resulting from the reaction of a polyethylene polyamine, e. g., diethylene triamine, with a dibasic acid, e. g., succinic acid, in molar proportions of two to one. These polyalkylene polyamine compounds are condensed with non-aromatic carboxylic acids containing at least 12 and preferably at least 16 carbon atoms. Such non-aromatic carboxylic acids may be substituted or unsubstituted, straight or branched chain, or cyclic, and saturated or unsaturated. Thus, carboxylic acids other than those present in or derived from vegetable and animal fats and oils may be used, for instance, naphthenic acids. The resulting polyalkylene polyamide compounds may comprise in part high molecular weight fatty acids and in part other high molecular weight carboxylic acids and/or cyclic acids. Examples of such acylating acids are oleic acid, stearic acid, palmitic acid, erucic acid, linoleic acid, linolenic acid, ricinoleic acid, palmitated ricinoleic acid, monohydroxy stearic acid, dihydroxy stearic acid, cetyloxy butyric acid, behenic acid, ketohydroxy stearic acid, lauric acid, high molecular weight naphthenic acids, and the various aldehyde acids which may be prepared from ricinoleic acid. Methods of preparing the last-mentioned aldehyde acids are disclosed, for instance, in the United States patents to Colbeth Nos. 2,058,568 and 2,126,368.

These high molecular weight polyamides may be prepared by condensing a polyalkylene polyamine with a non-aromatic carboxylic acid or a derivative thereof, such as an ester, anhydride or halide thereof, in such proportions and under such conditions as to effect at least monoacylation of both of the primary amino groups present in the polyalkylene polyamine. The fatty glycerides are examples of esters that are good acylating agents, for instance, tallow, coconut oil, lard oil, cotton-seed oil, peanut oil, soy bean oil, castor oil, whale oil, sardine oil, and the like. In general, condensation may be carried out by simply heating a polyalkylene polyamine with a non-aromatic carboxylic acid, a fatty acid, a fatty glyceride, or an acyl halide, in appropriate molecular proportions, for instance, with one or more moles of fatty acid for each mole of polyalkylene polyamine. I have found that reacting a fatty acid, e. g., stearic acid, with a polyamine, e. g., diethylene triamine, in equimolecular ratio at the conventional amidization temperature of 175° C. (±20° C.) will result in the production of the diamide as the major reaction product, and, in fact, only a trace of the monoamide can be found. The heating may be carried out for several hours (from 2 to 6 or more) at from about 140° C. upwardly. For the preparation of triacylated or tetraacylated compounds from polyalkylene polyamines containing two or more secondary amino groups, a temperature of 175° C. or higher is preferred.

From these polyalkylene polyamides of higher fatty acids prepared as described hereinabove, I next prepare water dispersible compounds by reacting the polyalkylene polyamides with an amine-alkylating agent such as dimethyl sulfate or dimethyl sulfite. In general, at least one molecular proportion of dimethyl sulfate or dimethyl sulfite is used in conjunction with one molecular proportion of polyalkylene polyamide. It is believed that when a one-to-one molecular ratio is employed, the resulting products are salts of the monomethylated derivatives of the polyalkylene polyamides. When dimethyl sulfate is employed, the salts of methyl sulfuric acid are obtained. When dimethyl sulfite is employed, the salts of the corresponding sulfinic acids are obtained.

By way of example, if one starts with triethylene tetramine that has been diacylated in the primary amino groups with a compound such as stearic acid, thus leaving two secondary amino groups in the molecule, upon the addition of the first mole of dimethyl sulfate, the methyl sulfuric acid salt will form on one of the secondary amino groups. The addition of the second mole of dimethyl sulfate will form the methyl sulfuric acid salt of the remaining secondary amino group. Upon addition of a third mole of dimethyl sulfate, the hydrogen of the sulfuric acid salt group will be replaced by a methyl group, forming the quaternary compound. On the other hand, if the triethylene tetramine had been triacylated, the quaternary salt would be formed upon the addition of two moles of dimethyl sulfate.

In general, the dimethyl sulfate or dimethyl sulfite may simply be added to the polyalkylene polyamide and such heat supplied as may be required for completing the reaction. If desired, a solvent, such a pyridine, may be used, or alkali may be added to the reaction mixture.

When the polyalkylene polyamide contains at least two acyl groups derived from fatty acids containing at least 16 carbon atoms or from other high molecular weight carboxylic acids such as, for example, naphthenic acids, additional short chain acylating groups, such as the acetyl group, may be also introduced into the polyalkylene polyamide.

The following examples are illustrative of the types of compounds falling within the above-defined class.

EXAMPLES

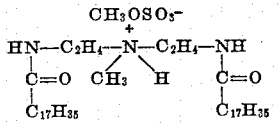

Methyl sulfuric acid salt of N-methyl, N',N'' distearoyl diethylene triamine

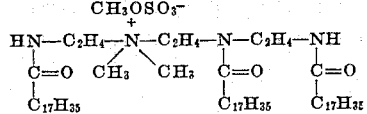

Dimethyl ammonium methyl sulfate quaternary salt of tristearoyl triethylene tetramine

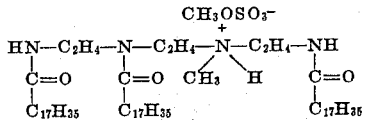

Methyl sulfuric acid salt of N-methyl, N',N'',N''' tristearoyl triethylene tetramine

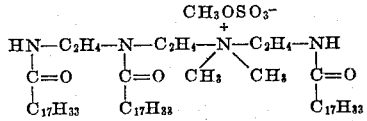

Dimethyl ammonium methyl sulfate quaternary of the trioleamide of triethylene tetramine

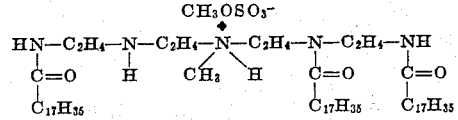

Methyl sulfuric acid salt of N-methyl, N',N'',N''' tristearoyl tetraethylene pentamine

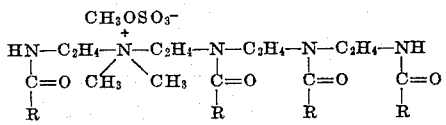

Dimethyl ammonium methyl sulfate quaternary salt of tetranaphthenoyl tetraethylene pentamine. R represents a naphthenic acid residue

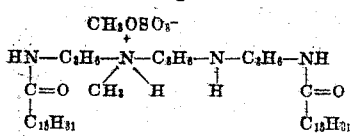

Methyl sulfuric acid salt of N-methyl, N',N'' dipalmitoyl tripropylene tetramine

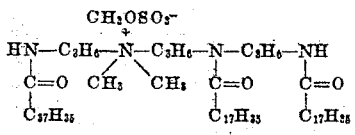

Dimethyl ammonium methyl sulfate quaternary of tristearoyl tripropylene tetramine

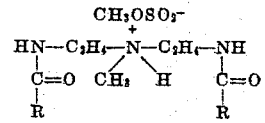

Methyl sulfonic acid salt of N-methyl, N',N'' dinaphthenoyl diethylene triamine. R represents a naphthenic acid residue

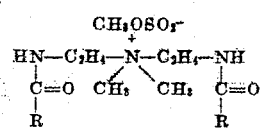

Dimethyl ammonium methyl sulfonate quaternary of dinaphthenoyl diethylene triamine, R being a naphthenic acid residue

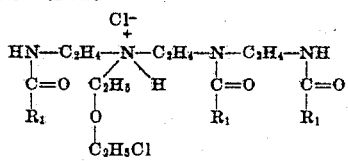

Condensation product obtained by reacting triethylene tetramine with soybean oil in equimolecular amounts and then treating the resulting polyamide with one mole of β,β' dichloroethyl ether. R₁ represents any of the fatty acid groups containing at least 11 carbon atoms present in the soybean oil

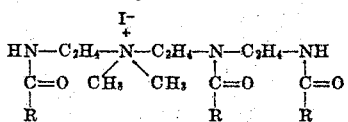

Dimethyl ammonium iodide quaternary salt of trinaphthenoyl triethylene tetramine. R represents a naphthenic acid residue

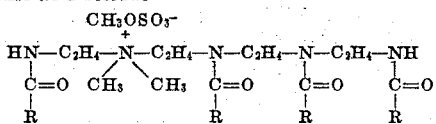

Dimethyl ammonium methyl sulfate quaternary salt of tetranaphthenoyl tetraethylene pentamine. R represents a naphthenic acid residue

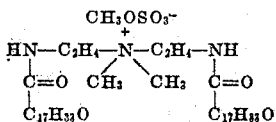

Dimethyl ammonium methyl sulfate quaternary salt of the diricinoleamide of diethylene triamine

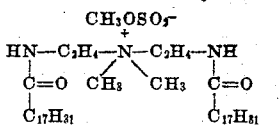

Dimethyl ammonium methyl sulfonate quaternary salt of the dilinoleamide of diethylene triamine

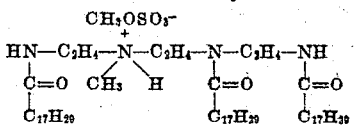

Methyl sulfuric acid salt of N-methyl, N',N'',N''' trilinolenoyl triethylene tetramine I have prepared all of the above noted salts of alkylated polyalkylene polyamides and quaternaries of polyalkylene polyamides. These compounds, together with others which I have investigated, comprise a sufficiently representative number of the class to lead me to believe that polyalkylene polyamides containing one or more unacylated amino groups can always be converted to either a salt of the methylated derivative or to the corresponding quaternary compound. The compounds so prepared have greater or lesser, but always in relatively high degree, desirable inhibiting influences on the foaming or excessive expansion of boiling water. The methylated acid salts are especially effective in neutral boiler waters, while the quaternary compounds are particularly effective in boiler waters showing an alkaline reaction but may also be used in neutral boiler waters.

The preparation of the compounds of the present invention is illustrated by the examples given hereinbelow:

Example I 8.8 gr. soybean oil, 2 gr. tetraethylene pentamine and 0.6 gr. water were heated in a flask, first for one-half hour on a steam bath, and thereafter for 2 hours at 150° C. After cooling 1.3 gr. dimethyl sulfate were added. The temperature thereupon initially rose to 90° C. When the reacting mixture began to cool, heat was applied, the final temperature one hour after the addition of the dimethyl sulfate being 148° C. 11.9 gr. of a clear viscous oil were obtained.

The efficiency of the resulting compound as a foam inhibitor was determined as follows. A salt solution was prepared by adding, to 500 cc. distilled water, 40.5 gr. NaCl, 6 gr. MgCl₂, 6 gr. MgSO₄.7H₂O and 2.25 gr. CaSO₄.2H₂O. This solution was brought to a boil and one-quarter part per million of the compound to be tested was added to the foaming solution in the form of a solution in carbon tetrachloride. Alcohol may also be used as a solvent. Foaming was prevented for over 35 minutes.

Another test of the same compound was carried out in a laboratory boiler operating under 200 lb. per. sq. in. pressure and containing 1000 cc. of a foaming water made up by adding to 1 liter distilled water ½ gr. CaSO₄.2H₂O, 2 gr. anhydrous Na₂CO₃ and 3 gr. anhydrous Na₂SO₄. The addition to said boiler of one milligram of the compound dissolved in alcohol inhibited foaming for 23 minutes. Other solvents for the anti-foam compound may be used, but dioxane tends to give erratic results and should, therefore, be avoided.

Example II 8.8 gr. soybean oil, 1.5 gr. triethylene tetramine and 0.6 gr. water were heated, first for ½ hour in a steam bath and thereafter for 2 hours at 156° C., yielding 10.1 gr. of a wax having a saponification No. of 3.9. 8.9 gr. of this wax were mixed with 1.2 gr. dimethyl sulfate. When the reaction mixture began to cool, heat was applied to raise the temperature to 153° C. After ½ hour, there was obtained a clear viscous oil dispersible in water.

When tested at 200 lb. per square inch pressure, as described hereinabove, the resulting compound was found to inhibit foaming for 30 minutes.

A similar product was prepared by heating together 1774 gr. soybean oil, 385 gr. triethylene tetramine (75.9%) and 100 c. c. water. Heating was continued for 6 hours at 142° to 157° C. The resulting product was mixed with 250 gr. dimethyl sulfate and stirred for 2 hours at an initial temperature of 97° C. which dropped to 74° C., at which time heat was applied so that the final temperature rose to 117° C. The final product is a light brown paste soluble in water at 10% concentration to form a thick yellow soapy liquid.

The last-mentioned product inhibited foaming for over 30 minutes at atmospheric pressure when tested as described hereinabove.

Example III 58.5 gr. soybean oil, 10.8 gr. triethylene tetramine (96%) and 5.3 gr. acetic anhydride were heated together for 8 hours at from 132° to 159° C., yielding a dark brown clear viscous oil characterized by an acid number of 15.8. On standing, the oil formed a paste having a melting point of 130° F. 7.4 gr. of the paste and 1.3 gr. dimethyl sulfate were stirred together in a test tube to form a clear homogeneous oil. The temperature rose from 22° to 45° C. One gram of the resulting oil was found to be dispersible in 10 cc. of water. A waxy precipitate was obtained on addition of 10% sodium carbonate solution.

The above identified oil was found to inhibit foaming for 35 minutes when tested under atmospheric pressure as described hereinabove.

Example IV

Oleic acid and triethylene tetramine in molecular proportions of 2:1 were heated together for 6 hours at from 140° to 161° C. and thereafter for three hours at from 143° to 158° C., yielding a product characterized by an acid number of 3.28. 13.2 gr. of the resulting amide were heated to just above its melting point and 5 c. c. of dimethyl sulfate was then added dropwise. The temperature rose to 140° C., and this temperature was maintained for one-half hour to complete the reaction. The final product could be dispersed in water as a 2% dispersion.

When tested under atmospheric pressure as described hereinabove, the final product inhibited foaming for 30 minutes.

Example V

Triethylene tetramine and oleic acid were reacted together as described in Example IV. 13.2 gr. of the resulting product was heated to just above its melting point, and 10.1 c. c. of dimethyl sulfate was introduced dropwise. The temperature rose to 140° C., and this temperature was maintained for ½ hour to complete the reaction. The final product could be dispersed in water as a 2% solution.

On testing under atmospheric pressure, the product of this example reduced the foaming of the water for about 30 minutes.

Example VI 29.2 gr. triethylene tetramine and 113.6 gr. of stearic acid were heated at about 180° C. for 6 hours. The reaction made was then allowed to cool to 125° C., and 43 gr. of dimethyl sulfite were added gradually. The initial reaction was exothermic, the temperature rising spontaneously to 135° C. (during the addition of 30 gr. of dimethyl sulfite). When no more heat was generated, the mixture was refluxed at 110° C. for 6 hours. After cooling, the reaction mixture was poured into benzene, the resulting hot solution filtered, and the filtrate was cooled to 10° C. to crystallize the product. Recrystallization from benzene was repeated. The crystalline product amount to 110 gr. and formed a stable emulsion with water when warmed to about 30° to 40° C. The resulting dispersion was not appreciably effected by the addition of sodium hydroxide solution.

When tested under atmospheric pressure, as described hereinabove, good foam inhibition was noted.

Similar results were obtained by using dimethyl sulfate in place of dimethyl sulfite.

Example VII

Triethylene tetramine was heated with lauric acid (prepared from coconut fatty acids by removal of fatty acids containing less than 12 carbon atoms) in molecular proportion of 3:1. The temperature was kept at 150° to 160° C. for more than 12 hours. 20.1 gr. of the resulting product was heated with 2.7 gr. of dimethyl sulfate for ½ hour at 153° to 155° C. The final product was a dark brown waxy solid dispersible in water.

When tested under 200 lbs. per square inch pressure, as described hereinabove, the product was found to inhibit foaming for 30 minutes. Very good foam inhibition was noted in testing at atmospheric pressure as described hereinabove.

Example VIII

Triethylene tetramine (14.6 gr. or 0.1 mole) was heated with 6.0 gr. (⅓ mole) of water and 96.6 gr. (0.3 mole) of naphthenic acid (a mixture of carboxylic acids recovered from crude petroleum having an average acid number of 174) for ½ hour at 85°–90° C. and then for 2 hours at 155° C.

To 68.4 gr. of the resulting polyamide was added 8.3 gr. of dimethyl sulfate (equimolar ratio). This addition caused a rise in temperature from 33 to 68° C. External heat was then applied until a temperature of 153° C. was reached. This was maintained for ½ hour.

The crude final product is essentially a methyl sulfuric acid salt of a methylated polynaphthenic amide of triethylene tetramine. It is a highly viscous black colored oil and is an effective antifoam in the crude state, so that purification need not be resorted to.

When tested under 200 lbs. per square inch pressure, as described hereinabove, the product was found to inhibit foaming for 30 minutes. Very good foam inhibition was noted in testing at atmospheric pressure as described hereinabove.

Example IX

Triethylene tetramine (14.6 gr. or 0.1 mole) was heated with 96.6 gr. (0.3 mole) of naphthenic acid for 6 hours at 180° C. The product is a highly viscous black oil.

This naphthenic polyamide was then treated with 29.4 gr. (0.2 mole) of methyl iodide. Heat was liberated spontaneously at the start. Then external heat was applied and a temperature of 150° C. held for 2 hours.

The final product is a quaternary derivative of the original naphthenic amide. It is a black colored waxy solid.

Very good foam inhibition was exhibited in the usual boiler tests.

Example X 8.8 gr. of soybean oil was added to a solution of 1.5 gr. triethylene tetramine and 0.6 gr. water. This mixture was heated for ½ hour at 90° C. and for 2 hours at 140° C.

To the resulting polyamide was then added 1.9 gr. of triglycol dichloride and the mixture heated for 4 hours at 140° C.

The resulting product is a brown paste-like mass which showed excellent anti-foam properties when tested in boiling salt solution at atmospheric pressure, and fair effectiveness in high pressure boiler test, lasting 9 minutes.

*Example XI*

8.8 gr. of soybean oil was added to a solution of 2.0 gr. of tetraethylene pentamine and 0.6 gr. water. This mixture was heated at 150° C. for 5½ hours, resulting in a clear light brown colored oil.

To this polyamide was then added 1.7 gr. of dichloroisopropyl ether and the mixture heated at 140° C. for 2 hours. A clear brown oil resulted which showed the good atmospheric inhibiting properties, but was ineffective under boiler conditions.

*Example XII*

8.8 gr. of soybean oil was added to a solution of 2.0 gr. of tetraethylene pentamine and 0.6 gr. water. This mixture was heated at 150° C. for 7½ hours. A brown colored viscous oil resulted.

To the above polyamide was then added 1.3 gr. of benzyl chloride. After heating this mixture for 1½ hours at 90° C. it was still a brown colored viscous oil.

In the experimental boiler it inhibited foam for 11 minutes.

*Example XIII*

8.8 gr. of soybean oil was added to 1.5 gr. of triethylene tetramine and the mixture heated at 150° C. for 6 hours. The resulting light brown colored wax was then treated with 1.3 gr. of dimethyl sulfate for 2 hours at 150° C. The methylated polyamide obtained in this manner was then converted to the corresponding quaternary ammonium salt by heating for 2 hours at 150° C. with 1.9 gr. of the methyl ester of p-toluene sulfonic acid.

This material is a dark brown colored wax-like solid. It shows good anti-foam properties in the standard boiler test.

The foam inhibiting compositions of the present invention may be introduced into steam boiler water in the form of colloidal dispersions that may be stabilized with tannin, gum arabic, pectin, or the like. If desired, the foam inhibiting compositions may be introduced into the boiler in the form of a solution in an appropriate solvent, such as isopropyl alcohol or the like. The dosages required are generally quite small, on the order of some few parts per million of boiler water. In general, from 0.1 to about 50 parts per million of foam inhibiting compounds may be added to boiler water, preferably in combination with tannin. Addition of foam inhibiting compounds may be repeated as required to prevent foaming.

The above examples have been given solely to illustrate the working of the present invention. Many details of composition and procedure may be varied within a wide range without departing from the principles of this invention.

I claim as my invention:

1. The method of generating steam from a water having a tendency to foam on boiling which comprises dispersing into said water in an amount sufficient substantially to inhibit the tendency of said water to foam on boiling a compound having the formula

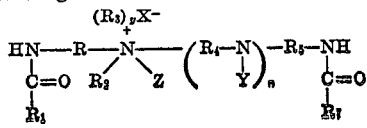

where $R_1$ and $R_7$ are aliphatic hydrocarbon groups containing at least 11 carbon atoms, R, $R_4$, and $R_5$ are short chain alkylene groups containing from two to three carbon atoms, $R_2$ is an alkyl chain of one to two carbon atoms, $R_3$ is a methyl group, X is an ion selected from the group consisting of the sulfate, sulfonate, and halide ions, Z is selected from the group consisting of hydrogen and methyl groups, Y is selected from the group consisting of hydrogen and carboxylic acyl radicals, but where Z is methyl, Y is acyl, $y$ is selected from the group consisting of 0 and 1, and $n$ is selected from the group consisting of 0, 1 and 2, and boiling the resulting dispersion.

2. The method of generating steam from a water having a tendency to foam on boiling which comprises dispersing into said water a composition comprising the methyl sulfuric acid salt of triethylene tetramine, said tetramine having been at least diacylated with at least two moles of a naphthenic acid, and boiling the resulting dispersion.

3. The method of generating steam from a water having a tendency to foam on boiling, which comprises dispersing into said water a composition comprising the methyl sulphuric acid salt of N-methyl, N',N'', distearoyl diethylene triamine, and boiling the resulting aqueous dispersion, said compound being dispersed into said water in an amount sufficient substantially to inhibit the tendency of said water to foam on boiling.

4. The method of generating steam from a water having a tendency to foam on boiling, which comprises dispersing into said water a composition comprising dimethyl ammonium methyl sulphate quaternary salt of tetranaphthenoyl tetraethylene pentamine, boiling the resulting aqueous dispersion, said compound being dispersed into said water in an amount sufficient substantially to inhibit the tendency of said water to foam on boiling.

5. The method of generating steam from a water having a tendency to foam on boiling, which comprises dispersing into said water a composition comprising the methyl sulfonic acid salt of N-methyl, N',N'', dinaphthenoyl diethylene triamine, and boiling the resulting aqueous dispersion, said product being dispersed into said water in an amount sufficient substantially to inhibit the tendency of said water to foam on boiling.

6. The method of generating steam from a water having a tendency to foam on boiling, which comprises dispersing into said water a composition comprising the dimethyl ammonium methyl sulfonate quaternary salt of dinaphthenoyl diethylene triamine, and boiling the resulting aqueous dispersion, said product being dispersed into said water in an amount sufficient substantially to inhibit the tendency of said water to foam on boiling.

LEWIS O. GUNDERSON.

REFERENCES CITED

The following references are of record in the file of this patent:

UNITED STATES PATENTS

| Number | Name | Date |
|---|---|---|
| 1,924,698 | Neelmeier et al. | Aug. 29, 1933 |
| 2,366,727 | Gunderson | Jan. 9, 1945 |